Sept. 27, 1966 W. HÄNDLER 3,275,811

BINARY REGISTER CONTROL UNIT

Filed Sept. 10, 1962 5 Sheets-Sheet 1

INVENTOR
Wolfgang Händler
BY Spencer & Kaye
ATTORNEYS

Sept. 27, 1966 W. HÄNDLER 3,275,811

BINARY REGISTER CONTROL UNIT

Filed Sept. 10, 1962 5 Sheets-Sheet 2

INVENTOR
Wolfgang Händler

BY Spencer & Kaye
ATTORNEYS

Sept. 27, 1966 W. HÄNDLER 3,275,811

BINARY REGISTER CONTROL UNIT

Filed Sept. 10, 1962 5 Sheets-Sheet 3

INVENTOR
Wolfgang Händler

BY Spencer & Kaye
ATTORNEYS

Sept. 27, 1966 W. HÄNDLER 3,275,811

BINARY REGISTER CONTROL UNIT

Filed Sept. 10, 1962 5 Sheets-Sheet 4

INVENTOR.
Wolfgang Händler

BY

Spencer & Kaye
ATTORNEYS

Sept. 27, 1966 W. HÄNDLER 3,275,811

BINARY REGISTER CONTROL UNIT

Filed Sept. 10, 1962 5 Sheets-Sheet 5

INVENTOR
WOLFGANG HÄNDLER

BY Spencer & Kaye

ATTORNEY

United States Patent Office 3,275,811

Patented Sept. 27, 1966

3,275,811

BINARY REGISTER CONTROL UNIT

Wolfgang Händler, Volklingen-Geislautern, Germany, assignor to Telefunken Patentverwertungs-G.m.b.H., Ulm (Danube), Germany Filed Sept. 10, 1962, Ser. No. 222,466
Claims priority, application Germany, Sept. 13, 1961, T 20,752
8 Claims. (Cl. 235—156)

The present invention relates generally to the computer art, and, more particularly, to an arithmetic unit of a digital computer and which includes several arithmetic registers connected with each other in order to carry out microoperations.

Arithmetic units include at least two arithmetic registers and preferably several such registers as well as a connecting network which provides for the carrying out of simple basic operations or microoperations. A microoperation is initiated by switching in a microcommand element controlled either directly by the program or by means of a microprogram control unit. When dealing with parallel arithmetic units, the microcommand element influences as many connecting circuits as there are binary positions or digits in one word. Exceptions to this are provided in peripheral operations in purely binary arithmetic units, and also in those arithmetic units operating with numbering systems other than binary, for example, decimal systems.

In Table I, which is provided in the Appendix, a sufficient amount of basic elements for arithmetic microoperations is set forth in the normal logical mode of notation, and this is provided for a purely binary parallel arithmetic unit having three registers: A, B, and C, for example. The jump and storage operations are omitted for purposes of clarity. In this table, the output of the $i^{th}$ of registers A, B, and C, in each case is designated $a_i$, $b_i$, and $c_i$, and the microcommand element assigned to the $\nu^{th}$ microoperation has been designated $s_\nu$. The effective outputs of the individual elements are presented in circuit algebraic terminology or disjunctive standard form to the left of the arrow and the horizontal serifs indicate the negated outputs. The arrow is to be read "results in" and it leads to the effective input of the element which is to store the connection result.

The term "element" refers to known bistable flip-flops, which, in the above example, have an input, a normal output, and a complementary output. The normal output assumes the condition fed to the input in synchronism with a machine clock pulse.

The basic number of connections mentioned above is sufficient for a purely binary arithmetic unit, but it is not suitable for an arithmetic unit which is to process, for example, decimal numbers which are coded in binary tetrads. Accordingly, a different basic supply of connections is necessary for each mode of representation of the numbers, or, alternatively, the basic number of connections and elements will have to be substantially greater to enable the carrying out of computations in any preselected number system with known computers.

With these defects of the prior art in mind, it is a main object of the present invention to provide an arithmetic unit permitting processing when any type of numbering system is used.

Another object of the instant invention is to provide a device of the character described which accomplishes its versatile functions in a relatively simple manner.

A further object of the invention is to provide an arithmetic unit of the character described wherein one or all of the arithmetic registers may be divided to provide several groups of information with the total number of binary positions or digits being smaller or equal to one arithmetic word and these may be processed simultaneously.

Still another object of the present invention is to provide an arrangement wherein different arithmetic processes may be simultaneously applied to different groups forming an arithmetic word.

These objects and others ancillary thereto are accomplished according to preferred embodiments of the invention wherein by a relatively simple increase of the basic elements and connections of the binary arithmetic unit, any type of numbering system whatsoever can be processed. It may be noted that there is a known arrangement wherein two groups forming an arithmetic word can be operated upon with different arithmetic processes, and this is provided by the so-called mask or screen register which isolates partial groups of an arithmetic register by means of an intersection or logical conjunction of the respectively corresponding binary digits or positions. These partial groups are then fed or subjected to different working processes. However, to carry out such an operation with the known mask register, several clock pulses are necessary to provide intersection of a partial group, processing of the partial group, shifting the mask register, isolating another partial group, processing of this group, etc. On the other hand, the arrangement according to the present invention can subject several partial groups to different selected operations simultaneously.

These properties of the arithmetic units of the present invention are provided by including as an additional piece of apparatus at least one connection filter which includes one $n$ digit or position register, and which may be considered a connection register, and such a logical connection network for each position or digit that the content of the connection register controls the performance or the omission or non-performance of microoperations pertaining to the elements in the respectively assigned binary positions.

Furthermore, each connection filter is coordinated with one or two binary control lines which are supervised or controlled by a control unit. These control lines render a microoperation effective either at those binary positions at which a ONE condition is present in the connection register, or at these positions at which a ZERO condition is present in the connection register.

These features of the present invention, may, in an advantageous manner, be used in arithmetic units having parallel connections as well as those having serial connections. However, for illustration of the present invention only the parallel connection will be set forth since it provides more varied application of the inventive connection filters and, on the other hand, it can be transformed into what may be thought of as a serial arithmetic unit by considering the connection of a single binary position or digit.

Additional objects and advantages of the present invention will become apparent upon consideration of the following description when taken in conjunction with the accompanying drawings in which.

Figure 3A:
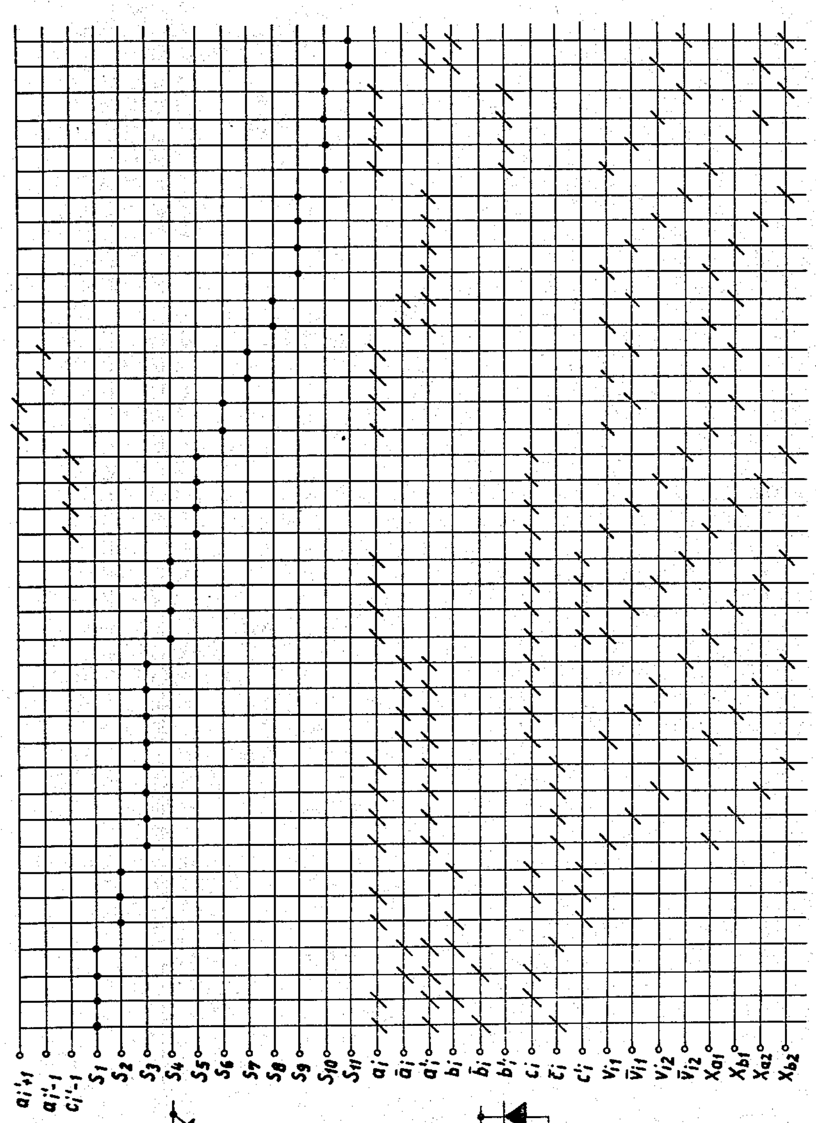

FIGURE 3*a* is a diagrammatic view which illustrtates a matrix plate which provides logical connections for a digit of a register.

Figure 3B:
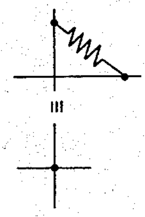

FIGURE 3*b* is an explanatory view which indicates that the dots in FIGURE 3*a* represent resistors.

Figure 3C:
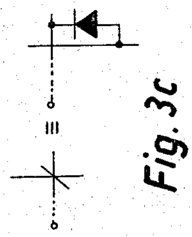

FIGURE 3*c* is an exemplary view which indicates that an oblique line in FIGURE 3*a* represents a diode.

Figure 4:
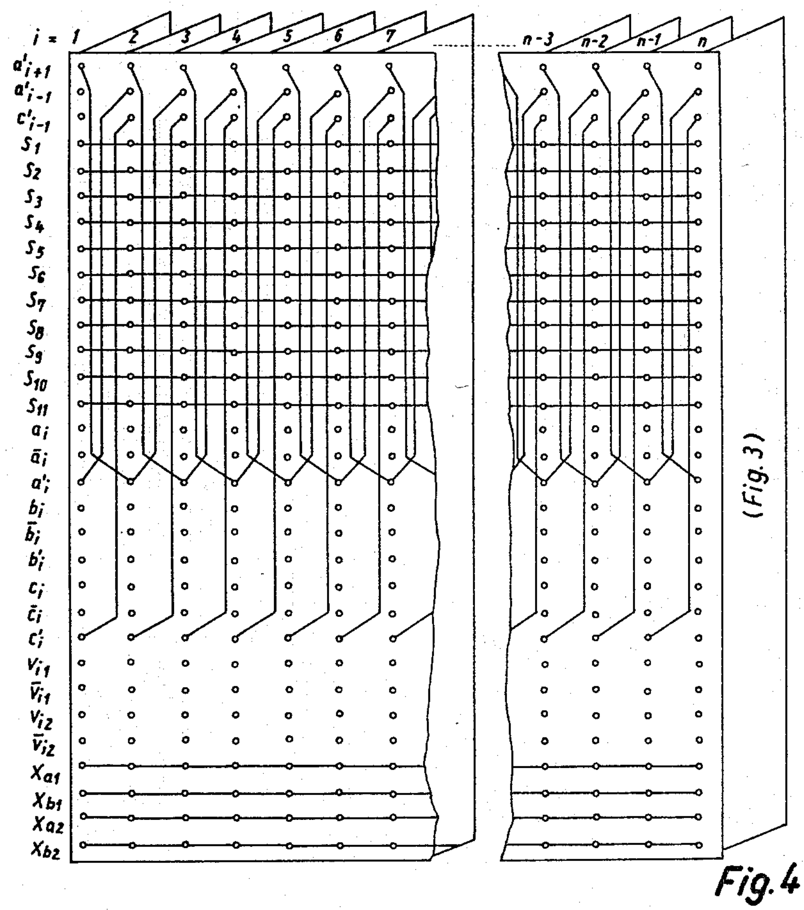

FIGURE 4 illustrates a plug board provided with a column for each digit.

Figure 5:
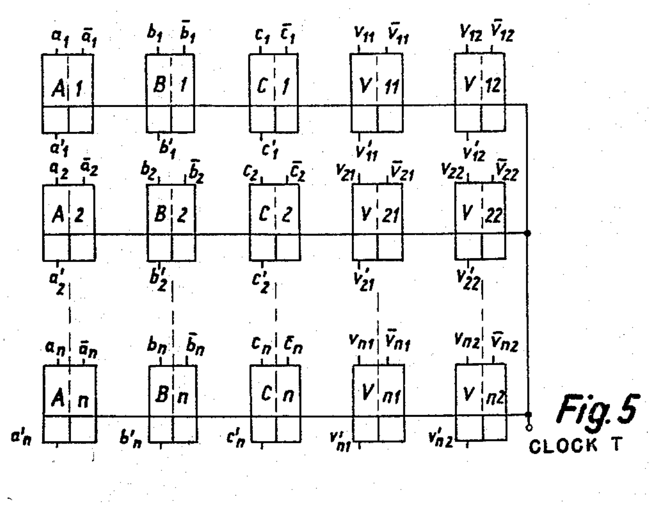

FIGURE 5 is a block diagram illustrating the various bistable elements connected to be provided with clock pulses simultaneously.

Figure 6:
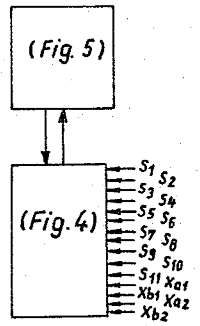

FIGURE 6 is a block diagram illustrating the plug board of FIGURE 4 being controlled by the respective lines.

Figure 7:
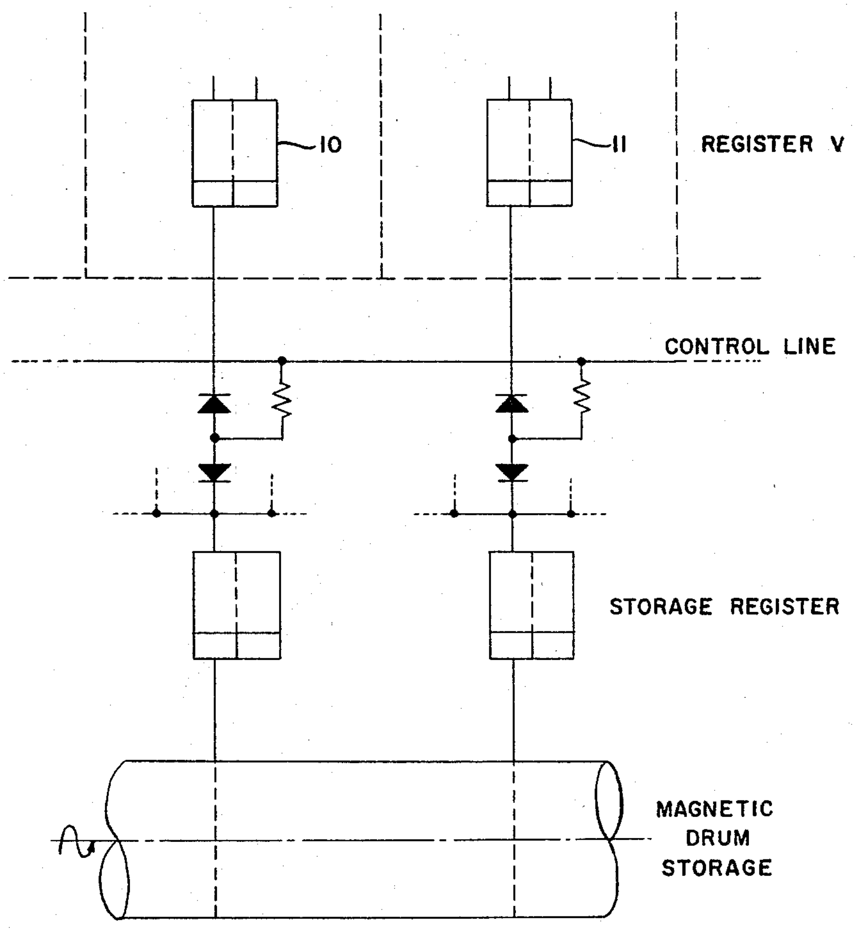

FIGURE 7 is a block diagram illustrating a connection register and a storage unit, connected to feed said connection register by means of a programmed command.

Figure 8:
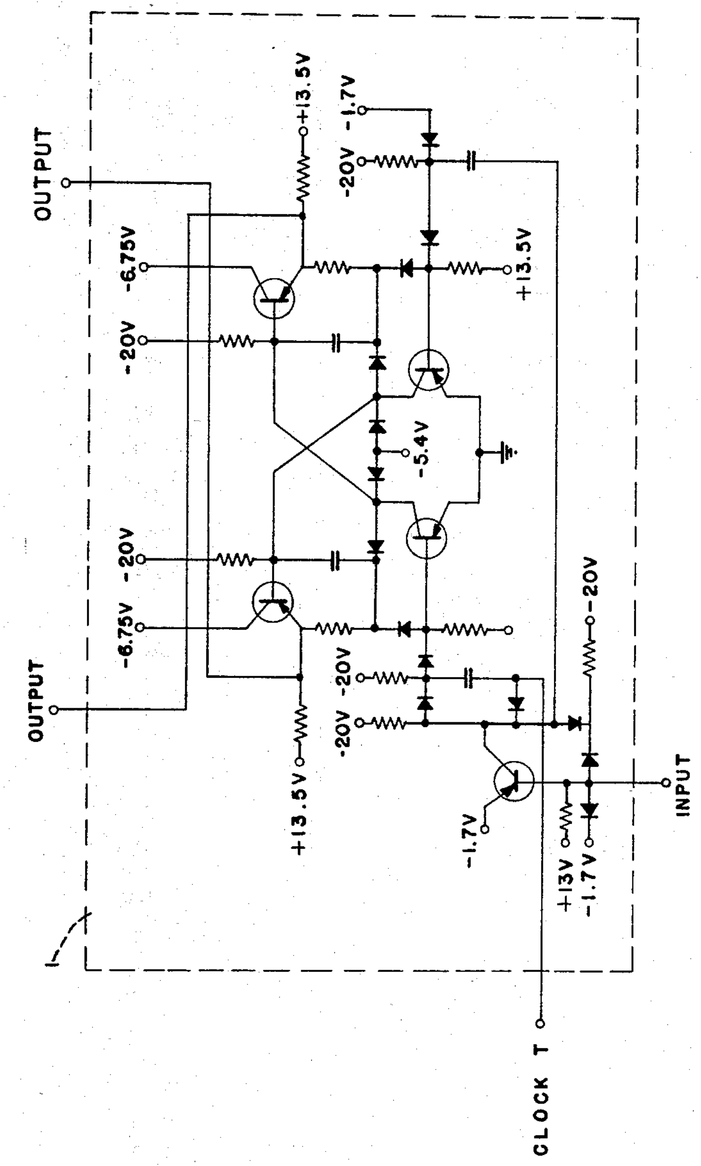

FIGURE 8 is a circuit diagram of a suitable bistable element for use with the present invention.

Generally, an arithmetic unit of a parallel digital compuer includes: several arithmetic registers; the logical connection thereof; and control lines via which the connections may be rendered effective. An arithmetic register is formed of as many bistable elements as binary digits or positions pertain to one word. In the following description this word length shall always be designated *n*.

Many types of bistable elements are known which are used in all kinds of various techniques, such as magnetic, electromechanical, and electronic. Thus, they are only indicated by blocks in the drawings and have, for example, a pulse type input as well as a static output. Additionally, a complementary output is available. The input of an element M is designated $m'$, the output is $m$, and the complementary output is $\bar{m}$. The logical connection is based on known diode logic in disjunctive standard form and the disjunctive resistor in each case pertains to the input circuit of the bistable elements.

Figure 1:
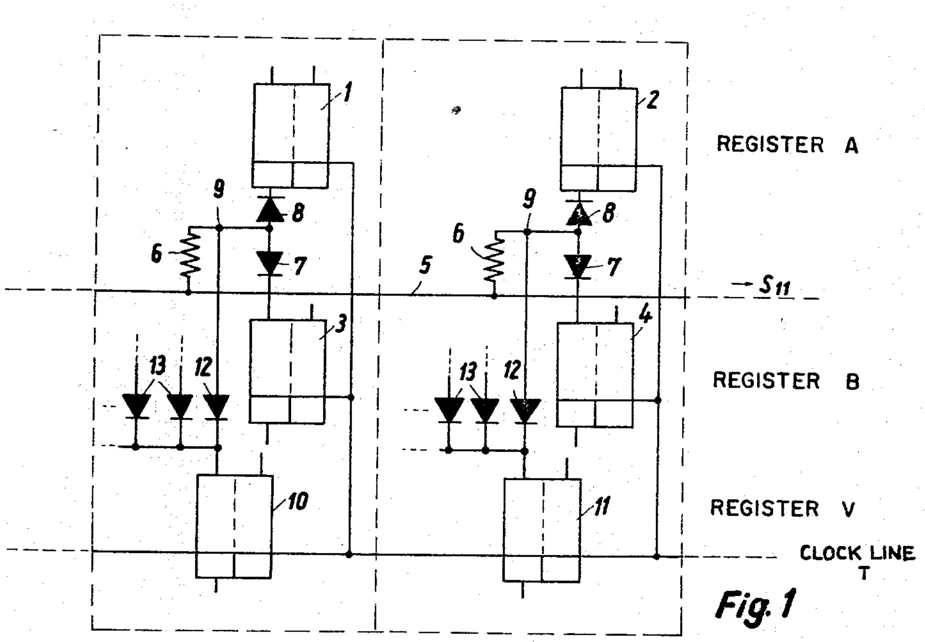
FIGURE 1 is a block diagram illustrating one connection which may be provided by the present invention.

With more particular reference to the drawings, FIGURE 1 illustrates two elements 1 and 2 of a register A and two elements 3 and 4 of a register B. These elements are connected with one another and with a third register C (not shown), in accordance with the above-mentioned basic connections. A control line is provided for each of these connections. Only a single connection as No. 11 in Table I is illustrated to explain the present invention. This is the transport or transfer connection from register B to register A which is controlled by means of the microoperation element S11 (not illustrated) arranged in the control unit. The output of element S11 is connected with a control line 5 passing through all *n* positions of the connection, only two of which are shown in FIGURE 1, and in each position being connected with a conjunction resistor 6.

When a signal is applied to the control line 5 the conditions of the normal outputs of the elements of register B are transferred to the coordinated or corresponding inputs of the elements of register A, via a conjunction diode 7 and a disjunction diode 8, respectively. The connection point 9 of the two diodes 7 and 8 and the resistor 6, termed the conjunction resistor, is termed the conjunction point of this connection. The inputs of all of the bistable elements of the arithmetic unit are synchronized by means of a central clock so that pulses which are simultaneously present at the control line 5 and at the clock line, transfer information from the register B into the register A.

A suitable bistable element is shown in FIGURE 8 and corresponds to elements 1 and 2 of register A. As shown, the circuit is provided with a single input and two outputs, a normal output and a complementary output. The complementary output is represented by a horizontal line thereover. The clock line T is also connected to the circuit of the bistable element for transferring the input pulse to the output thereof. The operation of such elements is known and therefore will not be explained in further detail.

Thus far, the circuit corresponds to that of known arithmetic units. However, a further register with *n* positions or digits is provided according to the invention and this may be considered a connection register. Two elements 10 and 11 of the connection register are shown in the drawing and they correspond to elements 1 and 2 of register A and elements 3 and 4 of register B. The normal outputs of the elements of this register V are connected with the respective conjunction point 9 via a respective additional conjunction diode 12. Thus, these outputs are effective as additional conditions in the individual positions. The transport connection is only effective at the places where a voltage corresponding to ONE is present at the outputs of the elements of the register V. Thus, the register V, in connection with the diodes 12, acts as a connection filter.

It should be noted that a certain position of the register V is always connected with the conjunction point of this position and that the outputs of the register V may be connected with further connections of Table I (not shown) via further diodes 13 of which two are illustrated. Each of such additional conditions introduced by the elements of register V may be described in every step of the logical equations listed in Table I, by an additional factor $v_1$ added to the initially mentioned microoperations so that the connection No. 11 explained above, instead of being $s_{11}b_1 \rightarrow a'_1$, now will be: $s_{11}b_1v_1 \rightarrow a'_1$.

Another embodiment of the present invention is shown in FIGURE 2 where again two positions of the parallel connection are shown. In this example, microoperation No. 8 is illustrated, that is, inversion of the register A. Each complementary output of the register elements 1 and 2 is connected with a conjunction point 15 via a conjunction diode 14. This conjunction point 15 has a signal applied thereto by means of a control line 16 via a conjunction resistor 17, in a manner known per se. A separate disjunction diode 18 leads to the input of each element 1 and 2. This unconditional inversion is made dependent upon register V by the elements 10 and 11 of register V which influence the respective conjunction points 15 via additional conjunction diodes 19.

To render the circuit arrangement even more versatile two additional control lines 20 and 21 are provided. The first line 20 is connected via diodes 22, with the conjunction points 15 of all of the connections to which the elements of register V are connected by the diodes 19. The connection network is duplicated with the second set including disjunction diodes 23, conjunction diodes 24, and conjunction resistors 25. The conjunction point 26 of the second connection is connected with the second, additional control line 21 via conjunction diodes 27 and it is connected with the complementary outputs of the elements of the register V via diodes 28. This circuit, in comparison to the above-mentioned microoperation No. 8 ($s_8\bar{a}_1 \rightarrow a'_1$), may be expressed by the function: $s_8\bar{a}_1v_1x + s_8\bar{a}_1\bar{v}_1\bar{x} \rightarrow a'_1$, where $x$ and $\bar{x}$ are the normal and complementary outputs of a microoperation element X, and these outputs are connected to the control line 20 and the control line 21, respectively.

Thus, this network is capable of carrying out the inversion at the binary positions or elements, at which a ONE is present in register V, or at those positions at which a ZERO is present in register V, depending upon whether line 20 or line 21 is excited. In this manner, an operation may be performed on one part of a word and subsequently another operation may be performed on the remainder of the word, without the necessity of changing the contents of the register V. This feature may be employed advantageously when treating mixed logarithmic numbers, for example, those whose number of mantissa and exponent positions may be changed depending upon the requirements with respect to accuracy and number range which are to be met in any particular case. This may be accomplished by a simple change of the contents of register V.

Figure 2:
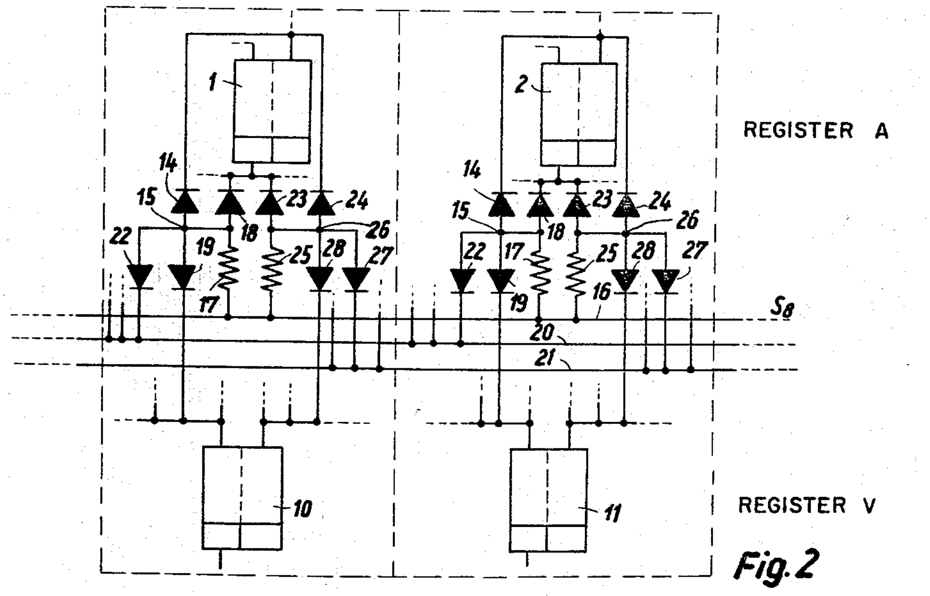
FIGURE 2 is another block diagram illustrating another connection which may be provided by the instant invention.

FIGURE 2 only shows a section and is should be understood that the same control lines 20 and 21, together with the same register V, are connected with many different operations, and this is indicated by the contact points on these lines as well as those on the register element inputs and outputs.

Furthermore, it is especially advantageous to have the two control lines 20 and 21 controlled by two microoperation elements $X_a$ and $X_b$ which are independent from each other. In this manner, the operational condition "unconditional connection" is achieved by switching in both elements and the contents of register V is of no concern, whereas, if only one element is provided, the register V must be cleared for this operational condition.

Another feature of the control unit of the present invention includes the provision of several connection filters which are either disjunctively or conjunctively connected with the first filter. In circuit algebraic terminology, the factor which is to be added to each microoperation, or to individual selected microoperations, would be, for the disjunctive connection:

$$x_{a1}v_{i1}+x_{b1}\bar{v}_{i1}+x_{a2}v_{i2}+x_{b2}\bar{v}_{i2}+ \ldots$$

and for the conjunctive connection:

$$(x_{a1}v_{i1}+x_{b1}\bar{v}_{i1})(x_{a2}v_{i2}+x_{b2}\bar{v}_{i2})(x_{a3} \ldots)$$

By employing several connection filters, the arithmetic unit is capable of applying several different microoperations simultaneously to different parts of the same word. For example, two numbers in semi logarithmical representation may be multiplied by multiplying the mantissas and, at the same time, adding the exponents. Also, each word may be split up and partial words of various types of information may be taken up and processed by the unit, e.g., employee number, number of working hours, wages per hour, deductions, etc.

Furthermore, any desired number system may be treated in this manner, for instance, binary coded decimal numbers, or British monetary units, measures, and weights. It is also possible to transform the parallel computer into $n$ serial computers, or into a parallel computer with a smaller word length ($n-m$ binary digits) so that additionally $m$ serial computers are produced. The connection filters according to the invention will be particularly successful in future large-scale computer systems intended for rental purposes, because here the number systems involved and the degree of usage of the machine vary very much with the individual problems, and the bottlenecks in the flow of information, mostly the feeding and removing of data, may be prevented by the appropriate combination of several programs.

Finally, a complete embodiment of an arithmetic unit will now be described in detail. Such a unit has two connection filters which are suitably connected to the above-mentioned basic parts of a binary parallel computer partly together, and partly individually. The additional factor for these microoperations in a preferred disjunctive connection is $(x_{a1}v_{i1}+x_{b1}\bar{v}_{i1}+x_{a2}v_{i2}+x_{b2}\bar{v}_{i2})$ or $(x_{a1}v_{i1}+x_{b1}\bar{v}_{i1})$ or $(x_{a2}v_{i2}+x_{b2}\bar{v}_{i2})$, depending upon whether both connection filters $V_1$, $V_2$ or only one is applied to a particular microoperation. This question is only of importance in connection with programming techniques. In the present example, operations No. 1 and 2 were left without connection filters; No. 3, No. 4, No. 5, No. 9 and No. 10 were provided with both filters; No. 6, No. 7, and No. 8 were provided with the first filter; and No. 11 was provided with the second filter. If the additional factor is multiplied into the function in order to obtain the disjunctive standard form, the microoperations shown in Table II result (see Appendix).

FIGURE 3*a* shows a cross bar or matrix plate with a group of parallel conductors arranged on each side of the plate. These two conductor groups intersect at right angles and are insulated from each other by the plate. All conductors of one of the two groups are connected to a plug board as indicated by the circles in FIGURE 3*a*. At certain places, two intersecting conductors are connected by means of diodes or resistors. A diode is indicated by an oblique line through the respective point of intersection, and the cathode is assumed to be connected with the conductor which is leading to the plug board, as shown in FIGURE 3*c*. A resistor similar to resistor 6 shown in FIGURE 1 is indicated by means of a dot at the respective intersection as shown in FIGURE 3*b*.

The plate shown in FIGURE 3*a* represents the complete wiring of the $i^{th}$ binary position of the arithmetic unit according to the present invention and is sufficiently explained by the functions of Table II. This plate thus has 31 contacts with the designations $a'_{i+1}$, $a'_{i-1}$, $c'_{i-1}$, $s_1$, $s_2$, $s_3$, $s_4$, $s_5$, $s_6$, $s_7$, $s_8$, $s_9$, $s_{10}$, $s_{11}$, $a_i$, $\bar{a}_i$, $a'_i$, $b_i$, $\bar{b}_i$, $b'_i$, $c_i$, $\bar{c}_i$, $c'_i$, $v_{i1}$, $\bar{v}_{i1}$, $v_{i2}$, $\bar{v}_{i2}$, $x_{a1}$, $x_{b1}$, $x_{a2}$, $x_{b2}$. One of these plates is provided for each position of a word and thus there are $n$ plates which are fixedly mounted in a plug board having $n$ columns, and the rear side of which is shown in FIGURE 4.

The control lines with the designations $s_1 \ldots s_{11}$ and $x_{a1}$ $x_{b1}$, $x_{a2}$, $x_{b2}$, emanating from the microoperation elements (not shown), do not possess any index $i$ and thus are connected through in all $n$ positions as shown in FIGURE 4. The contacts with the index $(i-1)$ and $(i+1)$ are respectively wired to corresponding sockets with the index $i$ in the neighboring column to the left and to the right, respectively. All sockets which are identified with the index $i$ are connected with contacts leading to register elements bearing the same designations, whereby $i=1, 2, 3, \ldots n$.

In FIGURE 5, these elements are shown as flip-flops. The register A includes the elements $A_1$, $A_2$, $A_3 \ldots A_n$, each of which has an input $a'_1$ as explained in connection with FIGURE 1, a normal output $a_1$, and a complementary output $\bar{a}_i$. Furthermore, the $n$-position register B with the elements $B_1$, $B_2$, $\ldots B_n$, and the register C with the elements $C_1$ $C_2$, $\ldots C_n$ are shown having corresponding inputs and outputs. The register $V_1$ includes elements $V_{11}$, $V_{21}$, $\ldots V_{n1}$ and register $V_2$ includes elements $V_{12}$, $V_{22}$, $\ldots V_{n2}$. All elements are centrally synchronized by a clock T and are connected with the logical network according to FIGURES 3 and 4 via their information inputs and outputs.

This arrangement of the arithmetic unit is shown in FIGURE 6. This figure further illustrates that the arithmetic unit is controlled by a control unit via fifteen control lines which are the outputs of fifteen bistable microoperation elements in the control section of the apparatus, not shown.

Further, all features of the invention may advantageously be used in a serial arithmetic unit whose arithmetic register is constructed as a shift register and whose logical connection takes place serially in only one binary position. This embodiment is particularly good in that it requires very little additional expenditure in comparison with known arithmetic units. Also, the use of the connection registers in accordance with the present invention does not exclude their use as auxiliary arithmetic registers for use in a known manner, provided they are appropriately wired.

Although the present invention has been explained in detail with reference to a specific parallel arithmetic unit, this arithmetic unit does not represent the only possible embodiment of the invention. No limitations exist as to the type of register elements or the logical switching elements which may be used, as to the number of connection filters used and the manner in which they are connected together, and as to the programming of the arithmetic unit according to the invention.

It will be understood that the above description of the present invention is susceptible to various modifications, changes, and adaptations, and the same are intended to be comprehended within the meaning and range of equivalents of the appended claims.

In FIGURE 7 a storage unit is shown comprising a magnetic drum storage and a storage register. This unit is connected to a connection register to feed and control it by means of a control line which is activated by a programmed command.

APPENDIX

TABLE I

No. 1. $s_1 a_i \bar{b}_i \bar{c}_i + s_1 \bar{a}_i \bar{b}_i c_i + s_1 \bar{a}_i b_i \bar{c}_i + s_1 a_i b_i c_i \rightarrow a_i'$ (Sum)

No. 2. $s_2 a_i b_i + s_2 a_i c_i + s_2 b_i c_i \rightarrow c_i'$ (carry)

No. 3. $s_3 a_i \bar{c}_i + s_3 \bar{a}_i c_i \rightarrow a_i'$ (elimination and removal of carry)

No. 4. $s_4 a_i c_i \rightarrow c_i'$ (sum from registers A and C)

No. 5. $s_5 c_i \rightarrow c'_{i-1}$ (shift register C to left)

No. 6. $s_6 a_i \rightarrow a'_{i+1}$ (shift register A to right)

No. 7. $s_7 a_i \rightarrow a'_{i-1}$ (shift register A to left)

No. 8. $s_8 \bar{a}_i \rightarrow a'_i$ (Inversion Register A)

No. 9. $s_9 \rightarrow a'_i$ (clear register A in B—1 complement)

No. 10. $s_{10} a_i \rightarrow b'_i$ (Transport Register A→B)

No. 11. $s_{11} b_i \rightarrow a'_i$ (Transport Register B→A)

TABLE II

No. 1. $s_1 a_i \bar{b}_i \bar{c}_i + s_1 \bar{a}_i \bar{b}_i c_i + s_1 \bar{a}_i b_i \bar{c}_i + s_1 a_i b_i c_i \rightarrow a'_i$ No. 2. $s_2 a_i b_i + s_2 a_i c_i + s_2 b_i c_i \rightarrow c'_i$ No. 3. $s_3 a_i \bar{c}_i x_{a1} v_{i1} + s_3 a_i \bar{c}_i x_{b1} \bar{v}_{i1} + s_3 a_i \bar{c}_i x_{a2} v_{i2} + s_3 a_i \bar{c}_i x_{b2} \bar{v}_{i2} +$
$+ s_3 \bar{a}_i c_i x_{a1} v_{i1} + s_3 \bar{a}_i c_i x_{b1} \bar{v}_{i1} + s_3 \bar{a}_i c_i x_{a2} v_{i2} +$
$+ s_3 \bar{a}_i c_i x_{b2} \bar{v}_{i2} \rightarrow a'_i$ No. 4. $s_4 a_i c_i x_{a1} v_{i1} + s_4 a_i c_i x_{b1} \bar{v}_{i1} + s_4 a_i c_i x_{a2} v_{i2} +$
$+ s_4 a_i c_i x_{b2} \bar{v}_{i2} \rightarrow c'_i$ No. 5. $s_5 c_i x_{a1} v_{i1} + s_5 c_i x_{b1} \bar{v}_{i1} + s_5 c_i x_{a2} v_{i2} + s_5 c_i x_{b2} \bar{v}_{i2} \rightarrow c'_{i-1}$ No. 6. $s_6 a_i x_{a1} v_{i1} + s_6 a_i x_{b1} \bar{v}_{i1} \rightarrow a'_{i+1}$ No. 7. $s_7 a_i x_{a1} v_{i1} + s_7 a_i x_{b1} \bar{v}_{i1} \rightarrow a'_{i-1}$ No. 8. $s_8 \bar{a}_i x_{a1} v_{i1} + s_8 \bar{a}_i x_{b1} \bar{v}_{i1} \rightarrow a'_i$ No. 9. $s_9 x_{a1} v_{i1} + s_9 x_{b1} \bar{v}_{i1} + s_9 x_{a2} v_{i2} + s_9 x_{b2} \bar{v}_{i2} \rightarrow a'_i$ No. 10. $s_{10} a_i x_{a1} v_{i1} + s_{10} a_i x_{b1} \bar{v}_{i1} + s_{10} a_i x_{a2} v_{i2} +$
$+ s_{10} a_i x_{b2} \bar{v}_{i2} \rightarrow b'_i$ No. 11. $s_{11} b_i x_{a2} v_{i2} + s_{11} b_i x_{b2} \bar{v}_{i2} \rightarrow a'_i$

What is claimed is:

1. An arithmetic unit of a digital computer having several arithmetic registers which are connected with each other for carrying out microoperations, comprising at least one connection filter, each including a connection register and a logical connection network for controlling the carrying out of microoperations in the respectively coordinated binary positions in accordance with the contents of the connection register.

2. An arithmetic unit for a digital computer, comprising a plurality of arithmetic registers which include digital binary elements connected together to carry out microoperations, and at least one connection filter including a connection register having elements and a logical connection network connected between cordinated digit elements of the arithmetic registers and the elements of the connection register for controlling, by means of the connection register, the carrying out of microoperations in selected digit elements of the arithmetic registers.

3. An arithmetic unit as defined in claim 2, comprising a binary control line of a control unit fixedly connected to each connection filter for effecting a microoperation, when activated, at those binary elements at which a ONE condition is present in the corresponding elements of the connection register, and for permitting a microoperation, when deactivated, at those binary elements at which a ZERO condition is present in the corresponding elements of the connection register.

4. An arithmetic unit as defined in claim 2, comprising two binary control lines of a control unit fixedly connected to each connection filter, one of said lines in the activated condition effecting a microoperation at those binary elements at which a ONE condition is present in the corresponding elements of the connection register, said other line, in the activated condition, effecting a microoperation at those elements where a ZERO condition is present in the corresponding elements of the connection register, whereby a microoperation is carried out in all binary elements when both control lines are activated.

5. An arithmetic unit as defined in claim 2 wherein said connection filter is connected with a limited number of selected microoperations.

6. An arithmetic unit as defined in claim 2 wherein several connection filters are provided which partly are effective together on the same microoperations and are connected with each other, and which partly are individually effective on different microoperations.

7. An arithmetic unit as defined in claim 2, comprising a storage register connected to feed and control said connection registers by means of a programmed command.

8. An arithmetic unit for a digital computer, comprising, in combination:

(a) a plurality of arithmetic registers, each including a plurality of bistable elements, one for each digit of the register;

(b) a connection register including a plurality of bistable elements each corresponding to similarly positioned elements of the arithmetic registers whereby all corresponding elements of the registers define a word position; and (c) a logical connection network connecting the connection register elements with the corresponding arithmetic register elements to define said positions and for controlling, by means of the elements of the connection register, the performance of microoperations in selected elements of the arithmetic registers.

References Cited by the Examiner

UNITED STATES PATENTS

| | | | |
|---|---|---|---|
| 2,666,579 | 1/1954 | Stibitz | 235—156 |
| 2,840,705 | 6/1958 | Scully | 235—156 |

ROBERT C. BAILEY, *Primary Examiner.*

MALCOLM A. MORRISON, *Examiner.*

J. S. IANDIORIO, M. LISS, *Assistant Examiners.*